United States Patent
Hu et al.

(10) Patent No.: US 11,245,133 B2
(45) Date of Patent: Feb. 8, 2022

(54) HIGH ENERGY DENSITY, HIGH POWER DENSITY, HIGH CAPACITY, AND ROOM TEMPERATURE CAPABLE RECHARGEABLE BATTERIES

(71) Applicant: SES Holdings Pte. Ltd., Singapore (SG)

(72) Inventors: Qichao Hu, Arlington, MA (US); Yury Matulevich, Waltham, MA (US); Yang Tang, Waltham, MA (US)

(73) Assignee: SES Holdings Pte. Ltd., Singapore (SG)

( * ) Notice: Subject to any disclaimer, the term of this patent is extended or adjusted under 35 U.S.C. 154(b) by 0 days.

(21) Appl. No.: 16/308,023

(22) PCT Filed: Jun. 7, 2017

(86) PCT No.: PCT/US2017/036361
§ 371 (c)(1),
(2) Date: Dec. 7, 2018

(87) PCT Pub. No.: WO2017/214276
PCT Pub. Date: Dec. 14, 2017

(65) Prior Publication Data
US 2019/0260066 A1      Aug. 22, 2019

Related U.S. Application Data

(60) Provisional application No. 62/347,361, filed on Jun. 8, 2016.

(51) Int. Cl.
*H01M 10/058* (2010.01)
*H01M 10/0569* (2010.01)
(Continued)

(52) U.S. Cl.
CPC ......... *H01M 10/058* (2013.01); *H01M 4/131* (2013.01); *H01M 4/134* (2013.01);
(Continued)

(58) Field of Classification Search
CPC ........... H01M 10/052; H01M 10/0525; H01M 10/0569; H01M 10/058; H01M 2004/021;
(Continued)

(56) References Cited

U.S. PATENT DOCUMENTS 6,265,100 B1 * 7/2001 Saaski .................. H01M 10/46
429/163
6,294,292 B1  9/2001 Tsushima et al.
(Continued)

FOREIGN PATENT DOCUMENTS

CN    105489845 A    4/2016
EP    1093672 A1    4/2001
(Continued)

OTHER PUBLICATIONS

European Search Report dated May 6, 2020, in connection with EP17810938.
(Continued)

*Primary Examiner* — Carlos Barcena
(74) *Attorney, Agent, or Firm* — Downs Rachlin Martin PLLC

(57) ABSTRACT

A high energy density, high power lithium metal anode rechargeable battery having volumetric energy density of >1000 Wh/L and/or a gravimetric energy density of >350 Wh/kg, that is capable of >1 C discharge at room temperature. In some embodiments, a high power lithium metal anode rechargeable battery of the present disclosure includes a lithium metal anode having a thickness of less than 20 μm and a ratio of anode capacity (n) to cathode capacity (p) in a discharged state, i.e., n/p, in a range of 0.8 to less than or
(Continued)

equal to 1 or in a range of 0.9 to less than or equal to 1. In some embodiments, a high power lithium metal anode rechargeable battery of the present disclosure further includes a high-voltage cathode and a hybrid separator.

28 Claims, 9 Drawing Sheets

(51) Int. Cl.
| | |
|---|---|
| H01M 10/0525 | (2010.01) |
| H01M 4/131 | (2010.01) |
| H01M 4/134 | (2010.01) |
| H01M 4/38 | (2006.01) |
| H01M 4/66 | (2006.01) |
| H01M 2/16 | (2006.01) |
| H01M 50/411 | (2021.01) |
| H01M 4/02 | (2006.01) |
| H01M 4/505 | (2010.01) |
| H01M 10/052 | (2010.01) |
| H01M 4/525 | (2010.01) |

(52) U.S. Cl.
CPC ........... *H01M 4/382* (2013.01); *H01M 4/661* (2013.01); *H01M 10/0525* (2013.01); *H01M 10/0569* (2013.01); *H01M 50/411* (2021.01); *H01M 4/505* (2013.01); *H01M 4/525* (2013.01); *H01M 10/052* (2013.01); *H01M 2004/021* (2013.01); *H01M 2300/0034* (2013.01); *H01M 2300/0094* (2013.01)

(58) Field of Classification Search
CPC . H01M 2300/0034; H01M 2300/0094; H01M 4/131; H01M 4/134; H01M 4/382; H01M 4/505; H01M 4/525; H01M 4/661; H01M 50/411
See application file for complete search history.

(56) References Cited

U.S. PATENT DOCUMENTS

| | | | |
|---|---|---|---|
| 6,432,586 B1* | 8/2002 | Zhang | H01M 50/411 429/251 |
| 2009/0111021 A1 | 4/2009 | Yazami et al. | |
| 2009/0309063 A1 | 12/2009 | Paulsen et al. | |
| 2013/0236764 A1* | 9/2013 | Hu | H01M 10/052 429/127 |
| 2013/0266842 A1* | 10/2013 | Woehrle | H01M 10/056 429/144 |
| 2014/0045033 A1* | 2/2014 | Zhang | H01M 2/1686 429/145 |
| 2014/0072879 A1 | 3/2014 | Chen et al. | |
| 2014/0272564 A1 | 9/2014 | Holme et al. | |
| 2015/0221986 A1* | 8/2015 | Hamers | H01M 10/052 429/341 |
| 2016/0087312 A1* | 3/2016 | Lee | H01M 10/0583 429/152 |
| 2016/0172660 A1* | 6/2016 | Fischer | H01M 4/1395 429/188 |
| 2016/0172661 A1 | 6/2016 | Fischer | |
| 2016/0240896 A1* | 8/2016 | Zhang | H01M 10/0568 |

FOREIGN PATENT DOCUMENTS

| | | |
|---|---|---|
| JP | 2005142156 A | 6/2005 |
| WO | 0139293 A2 | 5/2001 |
| WO | 2008109209 A2 | 9/2008 |
| WO | 2015192147 A8 | 12/2015 |
| WO | WO-2015/192147 | 12/2015 |

OTHER PUBLICATIONS

International Search Report and Written Opinion for International Patent Application No. PCT/US2017/036361, dated Sep. 29, 2017; pp. 1-10.
International Search Report and Written Opinion for International Patent Application No. PCT/US2017/036361, dated Sep. 29, 2017 (10 pages).

* cited by examiner

HIGH ENERGY DENSITY, HIGH POWER DENSITY, HIGH CAPACITY, AND ROOM TEMPERATURE CAPABLE RECHARGEABLE BATTERIES

CROSS-REFERENCE TO RELATED APPLICATIONS

This application is a national stage application of PCT/US2017/036361 titled "HIGH ENERGY DENSITY. HIGH POWER DENSITY. HIGH CAPACITY. AND ROOM TEMPERATURE CAPABLE "ANODE-FREE" RECHARGEABLE BATTERIES." filed on Jun. 7, 2017, which claims the benefit of U.S. Provisional Application 62/347,361, filed Jun. 8, 2016, the contents of each of which are incorporated herein by reference.

INCORPORATION BY REFERENCE

All patents, patent applications and publications cited herein are hereby incorporated by reference in their entirety in order to more fully describe the state of the art as known to those skilled therein as of the date of the invention described herein

TECHNICAL FIELD

This technology relates generally to non-aqueous electrolyte secondary energy storage cells. In particular, the invention relates to high energy density, high power density lithium rechargeable batteries.

BACKGROUND

The pursuit of high energy density is at the heart of smartphones, wearable gadgets and electric vehicles—devices that are quickly becoming extensions of our bodies. Lithium, which is the lightest and most electronegative metal in the periodic table, is a natural choice as anode.

Historically, non-aqueous secondary (rechargeable) cells using metallic lithium or its alloys as the negative electrode were the first rechargeable cells capable of generating high voltages and having high energy density. However, early on it became clear that their capacity decreased rapidly during cycling, and that their reliability and safety were impaired by the growth of the so-called mossy lithium and lithium dendrites to a degree that precluded these cells from the consumer market.

In conventional Li-ion rechargeable batteries, intercalant materials are used as both cathode and anode. For example, cathodes can be $LiFePO_4$, $LiCoO_2$, nickel-cobalt manganese oxide (NCM), nickel cobalt aluminum oxide (NCA), etc., and anodes can be graphite and silicon-graphite composite. Intercalation anodes only provide host structures for lithium ions and do not contribute to energy storage and are considered "deadweight". Also lithium ion storage capacities in the cathode and anode need to be "matched", and in Li-ion batteries, cathode capacity is designed to be strictly less than anode capacity (n/p ratio>1). This limits the energy density of Li-ion. The state-of-the-art graphite anode based Li-ion battery can reach <600 Wh/L and 220 Wh/kg; and the best silicon composite anode Li-ion battery can reach <800 Wh/L and 250 Wh/kg.

In conventional lithium metal primary batteries, lithium metal is used as anode. The cell is designed and built in the charged state, and there is only one discharge during its entire lifetime. Since the cell is in charged state, this presents safety issues during manufacturing and transportation. While primary lithium metal batteries have high energy density (~1000 Wh/L and >350 Wh/kg), they have poor power density, typically <0.1 C, limiting their applications.

In conventional solid state polymer lithium metal rechargeable batteries, lithium metal is used as the anode, and a solid polymer electrolyte is used as both separator and electrolyte. The lithium metal is typically a free standing thick foil with >60 μm thickness, the solid polymer electrolyte is typically a free standing thick film with >30 μm thickness. Solid polymer electrolyte has a limited electrochemical stability window, which limits the operating voltage of the cell. Thus, the cathode is typically a low voltage and low energy density $LiFePO_4$ intercalant. The poor conductivity of the solid polymer electrolyte also limits its performance to high operating temperatures of greater than 80° C. While it can achieve decent gravimetric energy density greater than 300 Wh/kg, its volumetric energy density improvement is limited due to the thick electrolyte and anode, and low capacity cathode.

In conventional solid state ceramics lithium metal rechargeable batteries, lithium metal or sometimes just copper foil is used as anode, a solid ceramics material for example, lithium phosphorus oxynitride (LiPON) or sulfide based material such as $Li_3PS_4$ is vacuum deposited on the anode as both electrolyte and separator. The cathode capacity is designed to be higher than anode capacity (n/p ratio≤1). For example, a 1 μm LiPON layer is sandwiched between a dense 25 μm thick $LiCoO_2$ (8 μm of lithium is expected to plate from such cathode), paired with 1 μm of thin excess lithium anode or sometimes just bare copper anode with no excess lithium. However, such thin ceramics coating requires vacuum deposition such as sputtering, ALD, or PLD, limiting the cell to thin-film micro-sized low capacity batteries, typically single layer batteries with <100 mAh capacity.

SUMMARY

The present invention describes the design, structure, and assembly processes of a high energy density (>1000 Wh/L, >350 Wh/kg), high power density (>1 C discharge), high capacity (>1 Ah), and room temperature operational "anode-free" rechargeable battery.

In one aspect, the invention includes a high energy density, high power lithium metal anode rechargeable battery having a volumetric energy density of >1000 Wh/L and/or a gravimetric energy density of >350 Wh/kg, that is capable of >1 C discharge at room temperature.

In one or more embodiments, the high energy density, high power lithium metal anode rechargeable battery of claim 1 has a volumetric energy density of 1200 Wh/L, a gravimetric energy density 400 Wh/kg, at at least 1 C discharge.

In one or more embodiments, the high energy density, high power lithium metal anode rechargeable battery has a rate of 10 C discharge at room temperature.

In one aspect, the invention includes high capacity lithium metal anode cell (>1 Ah) rechargeable battery comprising a high energy density cathode (>4 $mAh/cm^2$), ultra-thin lithium metal anode (<20 μm thickness), n/p ratio≤1, a non-ion conducting separator (<12 μm thick), a liquid and/or solid electrolyte, capable of discharging faster than 1 C at room temperature, and more than 100 cycles until 80% capacity retention.

In one aspect, the invention includes a high capacity lithium metal anode cell (>1 Ah) rechargeable battery comprising a high energy density cathode (>3 mAh/cm$^2$), ultrathin lithium metal anode (<15 μm thickness), n/p ratio<1, a non-ion conducting separator (<12 μm thick), a liquid and/or solid electrolyte, capable of discharging faster than 1 C at room temperature, and more than 200 cycles until 80% capacity retention.

In one aspect, the invention includes a high capacity lithium metal anode cell (>1 Ah) rechargeable battery comprising an ultra-thin lithium metal anode (<20 μm) when in fully discharge state, wherein its cathode capacity is greater than the capacity of the excess lithium on the anode (n/p ratio≤1).

In one or more embodiments, the high capacity rechargeable lithium metal anode cell (>1 Ah) rechargeable battery, when discharged at 0.5 C or faster, has an energy density of more than 1000 Wh/L and 350 Wh/kg.

In one aspect, the invention includes a high energy density, high power lithium metal anode rechargeable battery, including a high voltage cathode; an ultrathin lithium metal anode; wherein the capacity of the cathode is greater than the capacity of the anode in the discharged state; a hybrid separator comprising a porous polymer film and a protective coating disposed thereon; and a non-aqueous liquid electrolyte selected to have electrochemical stability at the potential of the high voltage cathode material versus lithium.

In one or more embodiments, the lithium metal anode has a thickness in the discharged state of less than about 20 μm.

In one or more embodiments, the lithium metal anode has a thickness in the discharged state in the range of about 10 μm to less than 20 μm.

In one or more embodiments, the anode capacity is 90% of the cathode capacity.

In one or more embodiments, the lithium metal anode is disposed on a current collector.

In one or more embodiments, the current collector comprises a copper foil.

In one or more embodiments, the cathode has a potential vs. Li metal of greater than 4.0 V.

In one or more embodiments, the cathode has a potential vs. Li of about 4.0 V to about 4.5 V.

In one or more embodiments, the cathode has a potential vs. Li of about 4.2 V to about 4.4 V.

In one or more embodiments, the cathode has a general formula of $Li_xM_yO_z$, where M is a transition metal such as Co, Mn, Ni, V, Fe, or Cr.

In one or more embodiments, the cathode is layered or spinel oxide material selected from the group comprising of $LiCoO_2$, $Li(N_{1/3}Mn_{1/3}Co_{1/3})O_2$, $Li(Ni_{0.8}Co_{0.15}Al_{0.05})O_2$, $LiMn_2O_4$, $Li(Mn_{1.5}Ni_{0.5})_2O_4$, or their lithium rich versions.

In one or more embodiments, the cathode is a porous coating comprising of the active material powder, a polymeric binder, and a conductive diluent.

In one or more embodiments, the cathode is a disposed on an aluminum foil.

In one or more embodiments, the cathode has an energy density of >3 mAh/cm$^2$.

The battery of claim 8, wherein the cathode has an energy density of 3-10 mAh/cm$^2$.

In one or more embodiments, the cathode is a porous coating soaked with the non-aqueous liquid electrolyte.

In one or more embodiments, the porous polymer film is a polypropylene film, polyethylene film or mixed polypropylene/polyethylene film.

In one or more embodiments, the protective coating is an inorganic electrolyte.

In one or more embodiments, the inorganic electrolyte is selected from the group consisting of lithium silicates, lithium borates, lithium aluminates, lithium phosphates, lithium oxynitrides, lithium oxyborides, lithium silicosulfides, lithium borosulfides, lithium aluminosulfides, lithium phosphosulfides, and the like.

In one or more embodiments, the protectively layer comprises a polymer layer.

In one or more embodiments, the polymer is an ion conductive polymer layer.

In one or more embodiments, the protective coating comprises a plurality of layers.

In one or more embodiments, the ceramic coating comprises between 2 and 5 layers.

In one or more embodiments, at least one of the coating layers comprises a lithium ion conducting polymer.

In one or more embodiments, at least one of the coating layers comprises a lithium ion conducting polymer and at least one of the layers comprises a polymer.

In one or more embodiments, the non-aqueous electrolyte comprises an imide salt with a fluorosulfonyl group.

In one or more embodiments, the non-aqueous electrolyte comprises a perchlorate salt, wherein the electrolyte is electrochemically stable at operating voltages greater than 4.2V.

In one or more embodiments, the imide salt comprises LiFSI.

In one or more embodiments, the perchlorate salt has a concentration between 0.05M to 0.50M of the organic solvent, the perchlorate salt has a concentration between 0.25M to 0.50M of the organic solvent, or the perchlorate salt has a concentration between 0.35M to 0.45M of the organic solvent.

In one or more embodiments, the perchlorate salt is selected from the group consisting of: $LiClO_4$, $Ca(ClO_4)_2$, $Sr(ClO_4)_2$, $Mg(ClO_4)_2$, $Ba(ClO_4)_2$, and any combinations or mixtures thereof.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

In the Drawings.

DETAILED DESCRIPTION

Figure 1:
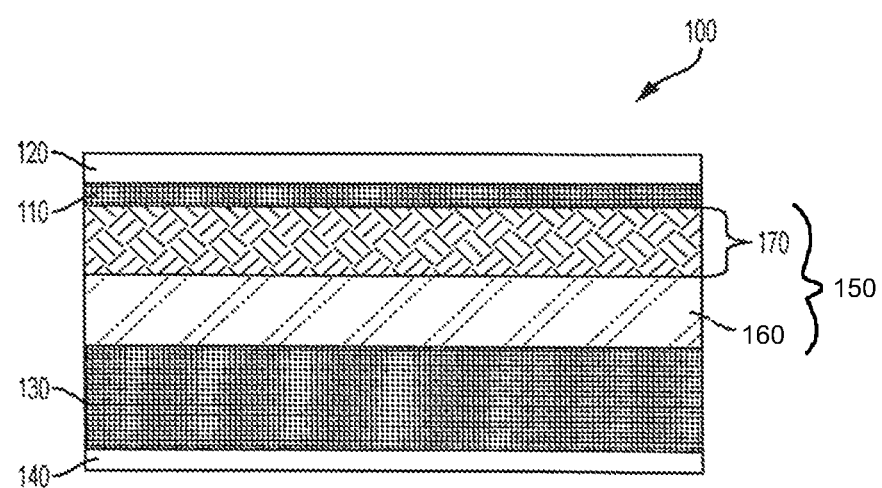
FIG. 1 is a schematic representation of a rechargeable lithium metal anode cell according to one or more embodiments.

New battery applications demand continuous improvements in battery energy density and charge/discharge rates. However, a conventional Li metal anode battery has low rate capability and/or limited capacity. A cell design that combines the energy density of primary lithium metal battery (e.g., ca. 1000 Wh/L and >300 Wh/kg) with the power density of rechargeable Li-ion battery (>1 C) is desired. In one aspect, the invention provides a rechargeable lithium metal anode cell having a volumetric energy density of >1000 Wh/L, for example, about 1000 Wh/L or about 1200 Wh/L, or about 1500 Wh/L up to about 2000 Wh/L, and/or a gravimetric energy density of >350 Wh/kg, for example about 350 Wh/kg, or about 400 Wh/kg, or about 450 Wh/kg up to about 700 Wh/kg, that is capable of >1 C discharge at room temperature. Discharge rates of up to 5 C, 10 C, 20 C and 40 C are contemplated.

A rechargeable lithium metal anode cell can suitably have a volumetric energy density of 1200 Wh/L, and or a gravimetric energy density 400 Wh/kg, at 1 C discharge, or a rate of 1 C-10 C discharge.

A rechargeable lithium metal anode cell can suitably have a volumetric energy density of >1000 Wh/L and/or a gravimetric energy density of >350 Wh/kg has a rate of 10 C discharge at room temperature.

A high capacity cell battery can suitably can suitably include an ultra-thin lithium metal anode, wherein its cathode capacity is greater than the capacity of the excess lithium on the anode (n/p ratio<1), when in the fully discharged state. The high capacity cell battery when discharged at 0.5 C or faster has an energy density of more than 1000 Wh/L and 350 Wh/kg.

A high capacity cell battery can suitably include a high energy density cathode, an ultra-thin lithium metal anode (e.g., ≤20 μm thickness), n/p ratio<1, for example 0>n/p<1, a non-ion conducting separator (e.g., <12 μm thick and for example between about 5 μm and about 30 μm), and a liquid and/or solid electrolyte. The battery is capable of discharging faster than 1 C at room temperature, while retaining at least 80% capacity retention after 100 cycles or more.

A high capacity cell can suitably include a high energy density cathode, an ultra-thin lithium metal anode (e.g., ≤15 μm thickness), n/p ratio≤1, for example 0≥n/p≤1 or 0≥n/p≤1, and a non-ion conducting separator, <12 μm thick and for example between about 5 μm and about 30 μm), a liquid and/or solid electrolyte. The battery is capable of discharging faster than 1 C at room temperature, while retaining at least 80% capacity retention after 200 cycles or more.

"Volumetric energy density" is defined as the amount of energy stored in a given system per unit volume and is reported as Wh/L. Suitably, the volumetric energy density can be about 1000 Wh/L or about 1200 Wh/L, or about 1500 Wh/L up to about 2000 Wh/L or a range bounded by any stated value.

"Gravimetric energy density" or "specific energy" defines battery capacity in weight (Wh/kg). Suitably, gravimetric energy density can be about 350 Wh/kg, or about 400 Wh/kg, or about 450 Wh/kg up to about 700 Wh/kg, or any range bounded by any stated value. Products requiring long runtimes at moderate load are optimized for high specific energy.

"Battery capacity" is a measure (typically in Amp-hr) of the charge stored by the battery, and is determined by the mass and specific capacity of cathode active material contained in the battery. As used herein "high capacity cell battery" has a capacity of >1 Ah, and for example has a capacity of about 1 Ah-200 Ah.

As used herein a "high energy density cathode" had a cathode loading density of >3 mAh/cm$^2$ and for example had a cathode loading density of 3-10 mAh/cm$^2$ or can be greater than 4 mAh/cm$^2$. Suitably, the cathode can have a capacity of greater than 3 mAh/cm$^2$ and can be for example 3-10 mAh/cm$^2$ or about 3 mAh/cm$^2$ or about 3.5 mAh/cm2 or about 4 mAh/cm$^2$ or about 4.5 mAh/cm$^2$ or about 5 mAh/cm$^2$ or a range bounded by any stated value.

As used herein an "an ultra-thin lithium metal anode" has a thickness of ≤20 μm thickness. Suitable thicknesses for the ultra-thin lithium metal anode in the practice of the invention can be, for example about 1 μm to about 20 μm or about ≤15 μm thickness.

As used herein, "n/p ratio" is the areal capacity ratio of negative to positive electrodes. In preparation of a high energy density battery, the capacity of the negative electrode suitably is 10% less than the cathode, e.g., n/p~0.91. However, ranges of 0.1 to less than 1.0, e.g., 0.9, 0.88, 0.97, 0.85, 0.82, 0.8, 0.75, 0.7, 0.65, 0.6, 0.55, 0.5, 0.45, 0.4, 0.35, 0.3, 0.25, 0.2, 0.15 or 0.1, or any range bounded by any such values, can be used.

The rechargeable cell is described with reference to FIG. 1 (a schematic illustration) and FIG. 2 (a photograph), where like elements are similarly labeled. The high energy density and high rate capability rechargeable lithium metal battery includes a high energy density cathode and an ultrathin lithium metal anode, wherein the anode capacity is less than the cathode capacity. The higher energy provided by the high energy density cathode, coupled with the small volume occupied by the ultrathin lithium metal anode imparts high energy density to the cell. In addition, the rechargeable lithium metal battery includes a hybrid electrolyte that permits operation of the cell at room temperature with a large electrochemical stability window and long cycle life at >1 C.

A suitable cell design may combine the cathode from a Li-ion battery (e.g., porous lithium cobalt oxide (LCO), nickel-cobalt manganese oxide (NCM) or nickel cobalt aluminum oxide with PVDF binder and carbon conductive) and the anode from solid state lithium metal battery (lithium metal anode with or without solid polymer and/or ceramic electrolyte).

A suitable cell design may combine the cathode and liquid electrolyte from Li-ion battery, and the anode and solid electrolyte coating from solid state lithium metal battery.

Figure 2:
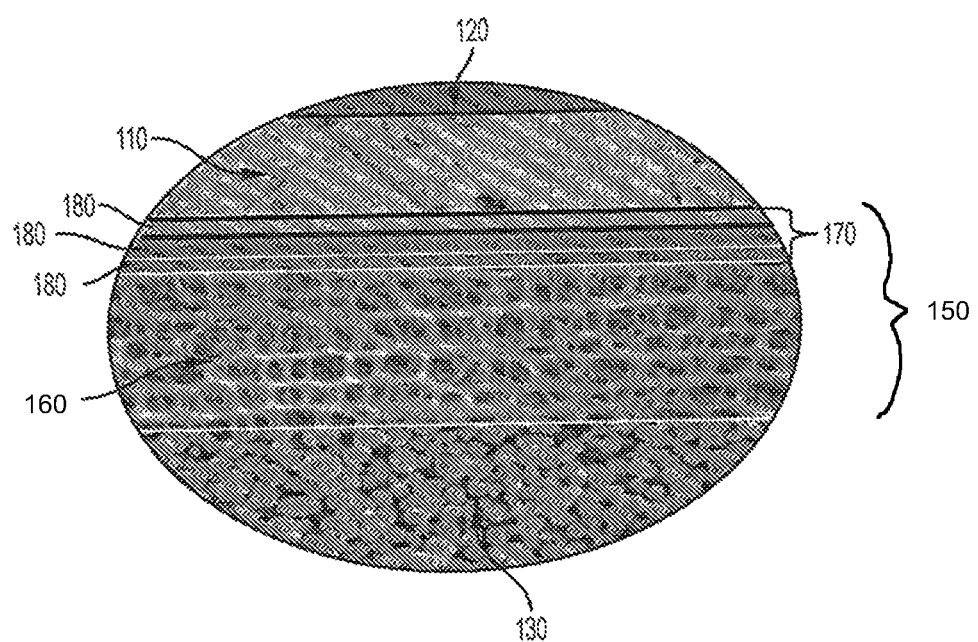
FIG. 2 is a photograph of a rechargeable lithium metal anode cell according to one or more embodiments.

FIG. 1 shows a rechargeable cell 100 that has a volumetric energy density of >1000 Wh/L and/or a gravimetric energy density of >350 Wh/kg. The cell is capable of >1 C discharge at room temperature over at least 5 cycles without significant capacity fade. Suitable batteries exhibit discharge capacity retention of at least about 80%, or at least about 85%, or at least about 90% after at least 5 cycles, 10 cycles, 20 cycles, 25 cycles, 40 cycles, 50 cycles, 60 cycles, 70 cycles, 80 cycles, 90 cycles, 100 cycles, 110 cycles, 120 cycles, 130 cycles, 150 cycles, or up to 200 cycles. The cycle number at ≥80% capacity retention can be even higher in some instances. The cycle number suitably can be a range bounded by any previously described value.

In one or more embodiments, the cell includes an ultrathin lithium metal anode 110. In one or more embodiments, the lithium metal anode in its discharged state has a thickness of less than 20 µm. In one or more embodiments, the lithium metal anode in its discharged state has a thickness in the range of about 1 µm to 20 µm, or about 5 µm to about 15 µm. The thin anode material can be formed by vapor deposition, for example, by evaporating lithium metal onto a metal foil such as copper 120. The lithium is roll pressed to smooth the deposited lithium metal. The metal foil can also serve as a current collector and can be, for example, copper or copper alloys, or other metal. The current collector can be selected for is electrochemical stability at the operating cell voltages in the presence of electrolyte. In one or more embodiments the anode is an ultra-thin free standing lithium anode, with the total thickness of ≤40 µm (ca. 20 µm on each side of the current collector.

The cell also includes a high energy density positive electrode (cathode) 130. High energy density can be suitably achieved by a cathode material having a potential versus lithium metal of greater than 4.0V, or greater than 4.1 V, greater than 4.2 V, greater than 4.3 V, greater than 4.4 V or up to 4.5V. In one or more embodiments, the cathode material has a potential versus lithium metal of about 4.0V to about 4.5V, or about 4.0 v to about 4.4 V or about 4.2 V to about 4.4 V. Suitable cathode materials include a material of the general formula of $Li_xM_yO_z$, where M is a transition metal such as Co, Mn, Ni, V, Fe, or Cr, and x, y, z are chosen to satisfy valence requirements. In one or more embodiments, the cathode is a layered or spinel oxide material selected from the group comprising of $LiCoO_2$, $Li(Ni_{1/3}Mn_{1/3}Co_{1/3})O_2$, $Li(Ni_{0.8}Co_{0.15}Al_{0.05})O_2$, $LiMn_2P_4$, $Li(Mn_{1.5}Ni_{0.5})_2O_4$, or their lithium rich versions. In one or more embodiments, the cathode material is $LiCoO_2$ (charged to 4.4V vs. Li metal), NCA or NCM (622, 811) (charged to 4.30V vs. Li metal). The voltage is 0.05V higher than with graphite anode with the same cathode, since lithium metal anode is 0.05V lower than graphite anode.

Suitably, the cathode can have a capacity of greater than 3 $mAh/cm^2$ and can be for example 3-10 $mAh/cm^2$ or about 3 $mAh/cm^2$ or about 3.5 $mAh/cm^2$ or about 4 $mAh/cm^2$ or about 4.5 $mAh/cm^2$ or about 5 $mAh/cm^2$ or a range bounded by any stated value. Each 1 $mAh/cm^2$ of lithium ion capacity from the cathode is equivalent to about 5 µm of lithium plated onto lithium metal anode at fully charged state. Therefore, a cathode having greater than 3 $mAh/cm^2$ capacity is able to deposit>15 µm lithium to the anode during cycling. In general, a thicker electrode layer and higher active material loading provides greater total capacity for the battery. The high capacity cathode suitably can have a thickness of less than 125 µm, e.g., between about 40 µm to 100 µm on one side, or 90 µm-210 µm on both sides including the current collector 140. The active material is typically loaded at about 10-30 $mg/cm^2$ on one side.

In the assembled form, the excess lithium metal anode capacity, that is, the amount of lithium storage capacity on the negative electrode (anode) (n) in the discharged state is less than or equal to the capacity of the positive electrode (cathode) (p), that is, n/p≤1. In one or more embodiments, the capacity of the negative electrode is 10% less than the cathode, e.g., n/p~0.9. However, ranges of 0.1 to less than 1.0, e.g., 0.9, 0.88, 0.97, 0.85, 0.82, 0.8, 0.75, 0.7, 0.65, 0.6, 0.55, 0.5, 0.45, 0.4, 0.35, 0.3, 0.25, 0.2, 0.15 or 0.1, or any range bounded by any such values, can be used. By providing greater lithium capacity in the cathode during assembly, it is possible to provide a rechargeable cell with high energy density. By using excess cathode active material (or a deficit of anode material), a greater portion of the lithium is located in the cathode in the assembled (uncharged) state. This allows the deposition of an ultrathin anode layer, which occupies a very small volume of the cell and increases the energy density of the cell.

In a conventional Li-ion battery, lithium ions are stored in the cathode in the beginning (discharged state), but on charging the ions move from the cathode to the anode and need storage capacity in the anode to accommodate the lithium ions. Additional materials such as graphite or silicon are needed to form a framework to host lithium ions, and they contribute to dead weight. In such conventional systems, an increase in cathode storage capacity (p), leads to an increase in anode storage capacity proportionally (n>p). The n/p ratio is greater than 1 because anode storage capacity is designed to be greater than cathode storage capacity, therefore the energy density is limited. In the anode-free design described herein, the lithium ions are stored in the cathode in the beginning (discharged state), and on charging the ions also move from cathode to anode. Because there is no host structure like graphite or silicon, it is possible to have excess cathode capacity, n/p ratio<1, without modification or accommodation at the anode. In one or more embodiments, anode volume and anode mass is reduced due to the anode host structure, while the cathode thickness (storage capacity) is increased without increasing anode thickness, resulting in increased energy density.

A high energy density cathode with >4 $mAh/cm^2$ can plate 20 µm of lithium onto the lithium metal anode. In order for excess lithium to be ≤1X, ≤20 µm excess lithium on anode can be used. For example, if cathode energy density is >4 $mAh/cm^2$, then the cathode capacity (p) is >20 µm of lithium, so in order to have n/p ratio<1, we use ≤20 µm excess lithium on anode. lithium ions are stored in the cathode in the discharged state, so excess lithium, as used herein, is the amount of lithium present on the anode in the discharged state.

The cathode can include a cathode material in particulate form and can include conductive additive. A conductive additive such as carbon or a metallic phase can be included. Exemplary conductive additives include carbon black, acetylene black, vapor grown fiber carbon ("VGCF") and fullerenic carbon nanotubes. Conductive diluents can be present in a range of about 1%-5% by weight of the total solid composition of the positive electrode. In one or more embodiments, the cathode is porous to permit rapid lithium diffusion throughout the layer and can have a pore volume fraction between about 20 and 70 vol. %.

The positive electrode (cathode) can be manufactured by applying a semi-liquid paste containing the cathode active compound and conductive additive homogeneously dispersed in a solution of a polymer binder in an appropriate casting solvent to one or both sides of a current collector foil and drying the applied positive electrode composition. A metallic substrate such as aluminum foil or other suitable metal can be used as the current collector. In one or more embodiments, a binder can be used to facilitate the application and mechanical robustness of the cathode layer. The binder used in the electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In one or more embodiments, the binder is PVDF and the conductive additive is carbon black.

The rechargeable lithium metal anode battery suitably can include a hybrid separator 150. The hybrid separator 150 includes a first porous polymer separator 160, and a second protective coating 170. The protective coating suitably can be a single layer of a ceramic or inorganic materials or polymer materials, as illustrated in FIG. 1. The protective layer suitably can be made of one or more layers 180, 180', 180" of different ceramic or inorganic materials or polymer materials, as shown in FIG. 2. The use of a hybrid separator contributes to the improved power density of the battery. In conventional solid electrolyte batteries that do not include a porous polymer separator, the inorganic layer needs to be thicker than the inorganic layers used in the hybrid separator. The battery therefore cannot achieve good power density because the thicker layer has lower conductivity. By having a porous polymer separator, it is possible to use a much thinner protection layer, allowing one to achieve higher conductivity and power density (e.g., 1 C at room temperature). In addition, by avoiding reliance on a solid electrolyte for the battery, sufficient conductivities can be achieved at room temperature, enabling a battery to have greater power density at room temperature.

The protective coating suitably can have a thickness of less than 5 µm, or less than 4 m, or less than 3 µm, or less than 2 µm, or less than 1 µm or as thin as 500 nm. In one or more embodiments, the protective coating can have a thickness in a range bounded by any of the previously noted values, and can be for example between 500 nm and 5 µm. In micro-size solid state batteries, the solid ceramics electrolyte layer is typically around 1 µm, however, the capacity of such solid state batteries limits their usefulness and application. In conventional high capacity (>1 Ah) solid state batteries, the solid polymer electrolyte layer is typically >20 µm m with the accompanying high temperature operational requirements. In one or more embodiments, the rechargeable lithium metal batteries disclosed herein provide high capacity (>1 Ah), but the protective layer is also only around 1 µm. In one or more embodiments, the thickness of the protective layer is less than 5 µm. The use of a thin protective layer with long cycle life is due to the combined use of a high quality protective layer, e.g., a layer that provides high lithium ion conductivity and good barrier to liquid electrolyte and use of an electrolyte that minimizes dendrite formation. The thin protective layer maximizes energy density (reducing the thickness of separator would increase cell level Wh/L and Wh/kg), and increases power density (since the protective layer is the rate limiting step in terms of conductivity, if the protective layer is too thick, high power density (discharge in 1 C) would not be possible.

In some embodiments, the first porous polymer separator can be a conventional porous separator, for example, made of polypropylene(PP) base film or a polyethylene (PE) base film or a combined PP/PE base film. The porous polymer separator 160 is a thin separator, e.g., less than 25 µm and is designed to separate the anode from the cathode while providing a fluid pathway for the passage of lithium. The porous separator provides high porosity, and optionally high tortuosity. While not required, high tortuosity can improve compressibility and electrolyte wettability of the separator, but also reduce dendrite suppression. In one or more embodiments, a surfactant coating is applied to the separator to improve surface wetting with the liquid electrolyte. In one example, a surfactant of imidazoline derivative is added to the liquid electrolyte and used to improve wetting of the separator.

In some embodiments, the second protective coating 170 is non-porous and lithium-ion conductive. In some embodiments, it can be a ceramic or inorganic layer. The ceramic or inorganic layer can be a single ion conductor layer, meaning that is it capable of conducting the lithium ion without addition of a mobile salt, e.g., only the lithium ion is mobile. In other embodiments, the inorganic layer can be porous and the ions conduct through electrolyte infused pores in the layer. In one or more embodiments, the protective layer can be a polymer layer and the layer can be porous or non-porous. The polymer can be an ion conducting polymer or it can include pores and the ions conduct through electrolyte infused pores in the layer. The protective coating provides a protective layer for the lithium metal anode by providing a barrier from the liquid electrolyte. Therefore, at least one layer of the protective layer is liquid impervious (non-porous). The protective coating can be applied to one or both sides of the separator. In a preferred embodiment, the second protective coating is applied to at least the side of the separator that faces the anode.

In one or more embodiments, the second protective coating can be an inorganic electrolyte layer conductive to lithium ions, e.g., a solid inorganic electrolyte. Examples of suitable ion conductive layers include lithium silicates, lithium borates, lithium aluminates, lithium phosphates, lithium oxynitrides, lithium oxyborides, lithium silicosulfides, lithium borosulfides, lithium aluminosulfides, lithium phosphosulfides, and the like. In particular embodiments, the layer is lithium phosphorous oxynitrides $Li_xPO_yN_z$ (LiPON) or lithium boron oxynitrides $Li_xBO_yN_z$ (LiBON), where x is 2.5-3.3, y is 3-4, and z is 0.1-1.0. In other embodiments, the conductive inorganic layer can be a binary or ternary oxide or sulfide that is alloyed with lithium. Exemplary binary oxides and sulfides include $B_2O_5$, $Al_2O_3$, $SiO_2$, $P_2O_5$, $TiO_2$, $P_2S_5$, or $SiS_2$. In other embodiments, the conductive inorganic layer can be a nitrided sulfide-based electrolyte. Sulfide-based electrolytes, $Li_2S/P_2S_5$ are good candidates for use as film electrolytes because they have Li-ion conductivities of more than $10^{-5}$ s/cm, e.g., $8\times10^{-5}$ S/cm, which is about 100 times higher conductivity than LiPON film electrolytes. Their electrochemical voltage window is up to 5.0V. The protective layer has a thickness of between about 50 angstroms and 5 micrometers, or between about 500 angstroms and 2000 angstroms. The protective layer can have a Li ion conductivity of between about $10^{-8}$ and about $10^{-2}$ $(ohm-cm)^{-1}$. The conductive layer is typically deposited using physical deposition methods, such as sputtering and evaporative deposition. In other embodiments, the conductive layer deposited by in situ alloying of the component elements, or in situ reaction of the component elements. Suitable methods for depositing such coatings include those described in U.S. patent application Ser. No. 62/366,382, filed Jul. 25, 2016, the contents of which are incorporated by reference.

A layer of the plurality of layers can suitably include a lithium ion conducting organic polymer composite. The composite coating deposited on the separator surface can suppress or even prevent lithium dendritic formation. With reduced or no dendrite formation, the coating subsequently results in an even lithium plating on the anode during cycling and reduces or eliminates the chance of dendrites causing shorting which improves the cycle life of lithium batteries. The composite material includes a lithium ion conducting organic polymer and a reinforcing fiber. The polymer is a lithium ion conducting polymer and can be selected from the group consisting of poly(methyl methacrylate), poly(hexyl methacrylate), polystyrene, poly(tetrafluoroethylene), polyethylene glycol, polyacrylonitrile, poly(vinylpyridine) or poly(lithium 2-acrylamido-2-methyl-1-propanesulfonate), aromatic polyamide, polyvinylpyrrolidone, poly(vinyl acetate) and poly(N-isopropylacrylamide), and any blends or copolymers thereof. The fibers suitably can be or can include organic fiber(s) or inorganic fiber(s), or any combinations thereof. The fibers can be inorganic or organic, and optionally, the fibers can be dispersed in the polymer matrix. The composite material can optionally also include particles, and optionally, the fiber and the particles are dispersed in the polymer matrix. In one or more embodiments, the composite coating layer forms a matrix including a polymer binder and a reinforcing fiber. In one or more embodiments, the use of polymers as binders to hold the fibers in place permits the composite coating to retain voids/porosity throughout. In one or more embodiments, the pore size of the should be smaller than Li dendrite in size, in order to suppress the dendrite growth. The average pore size of the composite coating suitably can be less than about 25 nm. Additional details of the composite polymer coating layer can be found in International Application PCT/US2016/024968, which is incorporated herein in its entirety by reference.

In one or more embodiments, the polymer coating can include multiple layers and for example, the polymer coating includes a first outer layer positioned for contact with an electrolyte comprising a first hydrophobic polymer and a liquid phase that is solvated by the hydrophobic polymer to form a polymer gel; and a second inner layer disposed between the lithium metal layer and the first outer layer comprising a second hydrophobic polymer providing mechanical strength and a physical barrier to the lithium metal layer. By coating a polymer layer on the lithium, it will protect or delay diffusion of liquid electrolyte through the polymer layer and to the lithium metal layer. The coated polymer layer demonstrates high mechanical strength and electrochemical stability.

The first layer can be selected to have high ionic conductivity with good mechanical properties that resists swelling by electrolyte. The second layer can be selected to have little to no reactivity with Li metal, high mechanical properties, and good adhesion to Li metal. Both polymers can have electrochemical stable in the range of −1V~5V electrochemical voltage window.

Similar materials can be used for both layers, however, the particular composition of each layer is selected to provide a first outer layer of a high swelling hydrophobic polymer containing a liquid phase, and a second inner layer of a low-swelling hydrophobic polymer having mechanical strength and serving as a physical barrier. Exemplary polymers for use in the multilayer coating include groups or blocks of fluoropolymers, polyacrylonitriles, polysulfones or polystyrenes. The polymer groups or blocks can be a homopolymer or a block polymer or combinations of miscible polymer groups. The coating can include polymer blends. There is no limitation of the possible combinations of suitable polymers. A particularly suitable candidate polymer includes fluorinated polymers. Fluorinated polymers are known as having high strength physical properties as well as electrochemical stability over a range of conditions. Also, they are not dissolved by the aprotic liquid electrolyte systems typically used for lithium ion batteries. Exemplary fluorinated polymers include homopolymers such as poly-vinylidene difluoride (PVdF), polyvinyl fluoride (PVF), poly(tetrafluoroethylene) (PTFE), polychlorotrifluoroethylene (PCTFE), perfluoroalkoxy polymers, fluorinated ethylene-propylene (FEP), polyethylenechloridetetrafluoroethylene (ECTFE), and the like. PVdF for example is a preferred high strength polymer that is resistant to solvents, acids, and bases. Co-polymers of fluorinated polymers, such as PVdF-HFP (hexafluoropropylene) co-polymer and PVdF-PS co-polymer, are also contemplated. Poly(ether ether sulfone) (PEES) can also be used, for example, as a copolymer or blend with fluorinated polymers. Other copolymers include polyethylene oxide (PEO), polyacrylonitrile (PAN), poly (methylmethacrylate) (PMMA) and polystyrene (PS).

The polymer layer can be a polymer-only layer, but it is preferred to have composite materials with other inorganic or liquid oligomers. For example, fluorinated polymers such as PVdF homo polymer or PVdF-HFP co-polymer have low ionic conductivity, and suitable additives are contemplated to increase the ionic conductivity. In one or more embodiments, the layers include an ionic liquid, plasticizers or a lithium salt to increase the ionic conductivity of the layer. Further details on suitable composite polymer layers is found in co-pending International Patent Application No. PCT/US16/38082, which in incorporated in its entirety by reference.

In one or more embodiments, the protective layer can have a plurality of layers. In one or more embodiments, the protective coating contains 2 or 3 or 4 or 5 or up to 10 layers. In one or more embodiments the layers are made up of lithium ion conducting inorganic layers that can be of the same or different composition. In one or more embodiments, the protective layer includes ion-conducting polymer layers. The protective layer can be all polymer layers, all inorganic layers or mixture of polymer and inorganic layers.

In one or more embodiments, the cell further includes a non-aqueous electrolyte that infuses the porosity of the cathode 130 and the first porous polymer separator 160. In one or more embodiments, the cell includes a dual layer electrolyte consisting of a liquid electrolyte soaked into the cathode, and a solid coating on lithium metal anode. The two electrolytes are mutually immiscible.

In one or more embodiments, the electrolyte is electrochemically stable over a wide voltage range, for example, a voltage range of about 3V to 4.5V. The non-aqueous electrolyte is selected to possess electrochemical stability over the voltage operation of the cell, which can be greater than 4.2 V. In some embodiments, a system is considered electrochemically stable when (1) a reduction of greater than about 85%, 90%, 95%, 96%, 97%, 98%, 99%, 99.5%, 99.6%, 99.9% of accumulated charge is achieved at high voltages (e.g., above 4.2V, e.g., 4.5V) for extended time periods (e.g., several hours, e.g., greater than 10 hours) and for multiple continuous voltammetry cycles (e.g., five or more cycles) as compared to electrolytes with no perchlorate and/or (2) the battery exhibits discharge capacity of at least 80% after 4 or more cycles.

In one or more embodiments, the electrolyte is an organic solvent with high lithium salt concentration. In some embodiments, the lithium salt is or comprises a lithium imide salt with a fluorosulfonyl ($FSO_2$) group. In some embodiments, the lithium imide salt is or comprises, or consists essentially of, $LiN(FSO_2)_2$. In some embodiments, the lithium imide salt is or comprises, or consists essentially of, $LiN(FSO_2)_2$, $LiN(FSO_2)(CF_3SO_2)$, $LiN(FSO_2)$ ($C_2F_5SO_2$), and any combinations or mixtures thereof. In some embodiments, high lithium salt concentration is a concentration of at least 2 moles per liter of the organic solvent. In some embodiments, high lithium salt concentration is a concentration of between 2 and 10 moles per liter of the organic solvent (including any subsets of this range). The electrolyte, which includes a salt and an organic solvent, may be selected to increase lithium coulombic efficiency to above 95%, above 97%, or above 99%. Furthermore, the higher lithium salt concentration in the electrolyte increases the flux of Li ions between the electrodes and raises the $Li^+$ ion mass transfer rate between the electrolyte and the metallic lithium electrode, thereby enhancing the uniformity of lithium deposition/dissolution during the charge/discharge process, which consequently improves the coulombic efficiency of the anode and the battery. Electrolytes with high salt concentration have improved lithium ion mobility and transference number (the ratio of charge transferred by $Li^+$ ions in the electrolyte).

In one or more embodiments, the electrolyte contains a cyclic carbonate selected from ethylene carbonate or propylene carbonate, their derivatives, and any combinations or mixtures thereof, as the organic solvent. In other embodiments, the electrolyte includes a cyclic ether selected from tetrahydrofuran or tetrahydropyran, their derivatives, and any combinations and mixtures thereof as the organic solvent. Suitable electrolytes include a glyme selected from dimethoxyethane, diethoxyethane, triglyme, or tetraglyme, or an ether selected from diethylether or methylbutylether, their derivatives, and any combinations and mixtures thereof as the organic solvent.

In one or more embodiments, the organic solvent consists essentially of dimethoxyethane and wherein the electrolyte has lithium salt concentration between 4 to 6 moles per liter of the organic solvent, or between 3 to 7 moles per liter of the organic solvent.

In one or more embodiments, the organic solvent consists essentially of ethylene carbonate, and the electrolyte has lithium salt concentration between 2 to 3 moles per liter of the organic solvent, between 2 to 4 moles per liter of the organic solvent.

In some embodiments, the electrolyte includes a perchlorate salt. In some embodiments, the perchlorate salt includes $LiClO_4$. In some embodiments, the perchlorate salt has a concentration between 0.05M to 0.50M of the organic solvent. In some embodiments, the perchlorate salt includes $LiClO_4$. In some embodiments, the perchlorate salt has a concentration between 0.25M to 0.50M of the organic solvent. In some embodiments, the perchlorate salt includes $LiClO_4$. In some embodiments, the perchlorate salt has a concentration between 0.35M to 0.45M of the organic solvent. In some embodiments, the perchlorate salt is selected from the group consisting of: $LiClO_4$, $Ca(ClO_4)_2$, $Sr(ClO_4)_2$, $Mg(ClO_4)_2$, $Ba(ClO_4)_2$, and any combinations or mixtures thereof. In some embodiments, the perchlorate salt comprises $LiClO_4$ and one or more perchlorate salts comprising an alkaline earth metal.

The concentration of lithium salt in the electrolyte also affects the columbic efficiency and cycle life of the lithium anode. It is widely known that dendrites start to grow in non-aqueous liquid electrolytes, when Li+ ions get depleted (becomes diffusion controlled) in the vicinity of the anode, where deposition occurs during charge.

When an external potential is applied during charge, the current flow through the battery leads to an ion concentration gradient in the electrolyte. At very low current densities, a small and stable Li+ ion concentration gradient form, and not many lithium dendrites nucleate under this condition. Any dendrite formed at this condition could be a result of local inhomogeneity in SEI and current density distribution. However, at current density values of practical significance in a battery, depletion of Li+ ion concentration near the anode, results in a substantial formation of lithium dendrites.

In this disclosure, a new class of high salt concentration electrolytes are described that enhance the cycling performance of high-energy rechargeable lithium metal batteries, through an improvement in columbic efficiency and suppression of dendritic growth in metallic lithium anode. A higher lithium salt concentration in the electrolyte elevates the current density at which lithium dendrites begin to grow. A higher salt concentration provides more Li+ ion supply at the vicinity of the anode during the charging process, thereby limiting the depletion and concentration gradient of Li+ ions in the electrolyte.

Furthermore, a higher lithium salt concentration in the electrolyte increases the flux of Li+ ion between the electrodes and raises the Li+ ion mass transfer rate between the electrolyte and the metallic lithium electrode, thereby enhancing the uniformity of lithium deposition/dissolution during the charge/discharge process, which consequently improves the columbic efficiency of the anode and the battery.

Electrolytes with high salt concentration have improved lithium ion mobility and transference number (the ratio of charge transferred by Li+ ions in the electrolyte). The conductivity of the Li+ ion is proportional to its concentration and mobility in the electrolyte. The mobility of the Li+ ion is determined by its size and viscosity of the medium. In low concentration electrolytes, lithium ions coordinate with solvent molecules and form a large solvation shell, and these solvated Li+ ions show a relatively lower mobility, than the anions. In high salt concentration systems, the size of this solvation shell can be reduced by the scarcity of the solvents, and the Li+ ions can exhibit higher mobility and transference number than the traditionally larger anions, which consequently improves the lithium deposition and cycle life of the cell.

Further information regarding electrolytes compositions suitable for use in the rechargeable lithium metal anode batteries include those described in co-pending U.S. patent application Ser. No. 15/049,528 and Ser. No. 15/108,579, the contents of which are incorporated by reference.

In another aspect, an assembly process for building a stacked cell with Li-ion cathodes, separator pockets and ultra-thin lithium metal anode is provided.

In another aspect, a method for completely inserting a cathode into a separator pocket to isolate mossy lithium dendrites from coming into direct contact with the cathode, and sealing all edges of the separator pocket is provided.

The invention is described with reference to the following examples, which are presented for the purpose of illustration only are not intended to be limiting of the invention.

Materials

A high energy density Cathode, $LiCoO_2$ (charged to 4.4V vs. Li metal) or NCM (622, 811 charged to 4.30V vs. Li metal) is used with a cathode loading of >3 mAh/cm² (>15 μm lithium plating during charge). The cathode layer includes a conductive additive such as graphite and a binder. The cathode material is pressed to 3.9 g/cc density on a 12 μm aluminum foil.

An ultra-thin Lithium Anode, ≤15 μm of lithium evaporated onto 8 μm copper foil is used as an anode. In this embodiment, the cathode loading of >3 mAh/cm² provides about 15 m to the anode on charging so n/p~1.0.

Liquid electrolyte (Cathode-lyte) is a non-aqueous electrolyte with lithium imide salt such as lithium bis(fluorosulfonyl)imide (LiFSI) at a concentration of at least 2 moles per liter and a perchlorate salt, such as $LiClO_4$.

Solid coating (Anode-lyte) is can be used as an example, but other ceramic or polymer coatings are contemplated, such as a coating using the single-ion conducting polymer electrolyte sulfonated poly ether ether sulfone (PEES).

A thin Separator with high porosity, high tortuosity can be used. Typically the separator has a porosity of >50% and is made of polypropylene base film and ceramics coatings on both side is used. The ceramic coating, in combination with the electrolyte sulfonated poly(ether) sulfone layer described above. A surfactant coating of imidazoline derivative, is applied to the separator to improve surface wetting with the Cathode-lyte.

Figure 3:
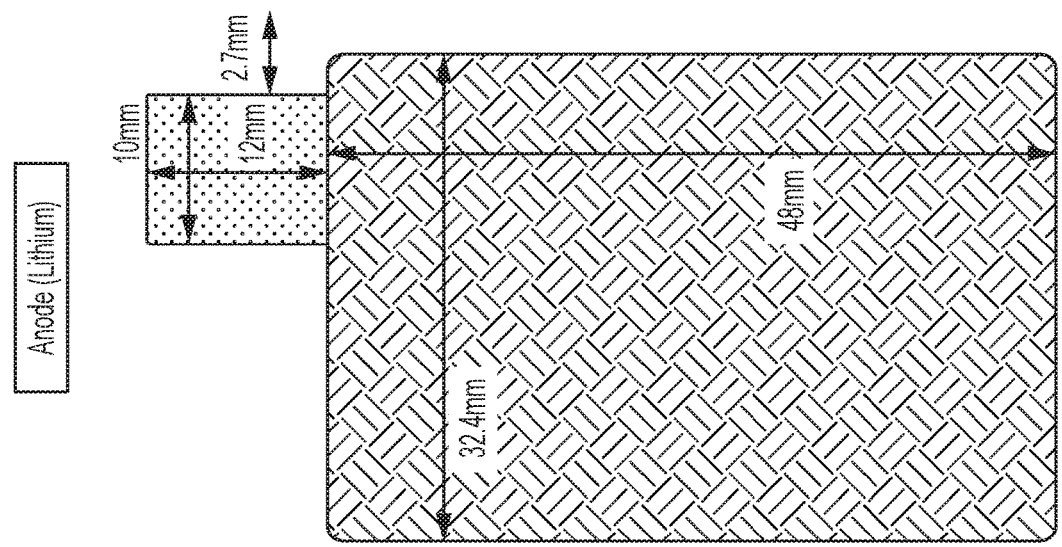
FIG. 3 is a schematic illustration of a cathode completely sealed inside separator pocket (left) and a lithium anode (right), according to one or more embodiments.
Figure 3:
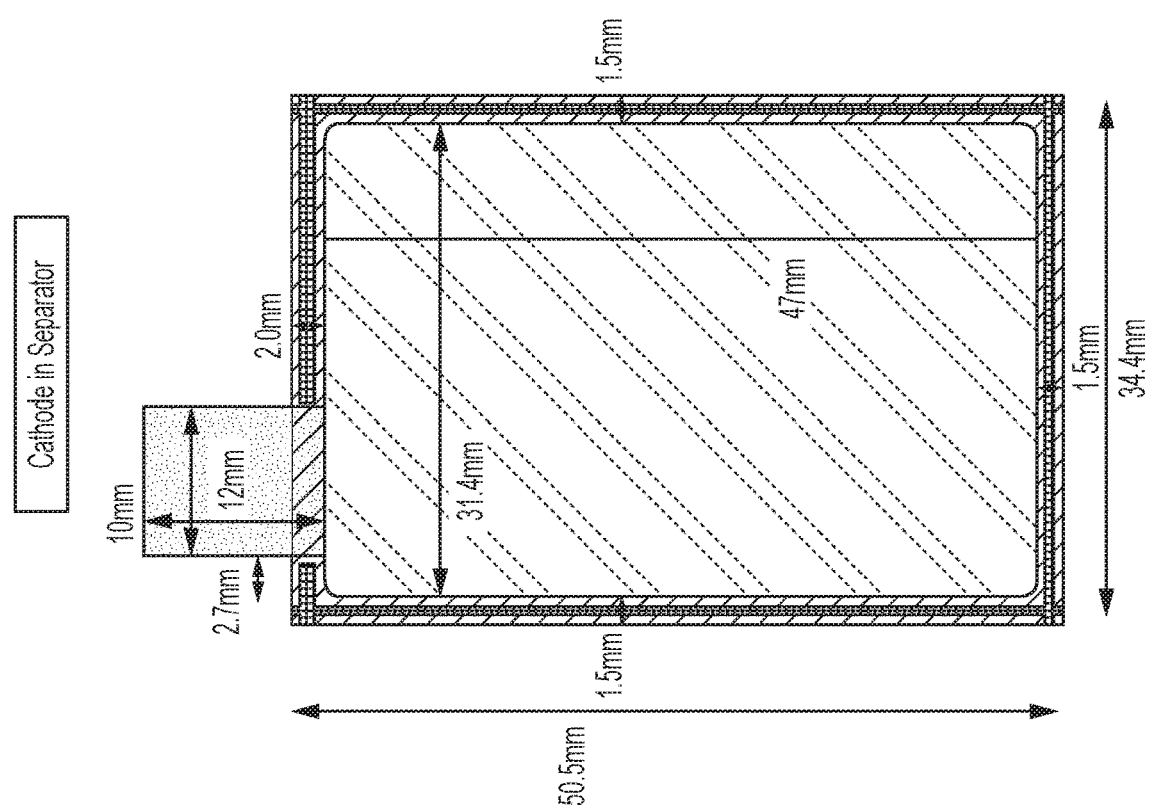

Assembly Process:

The cathode is stamped into electrode shape using a high precision steel die. It is then completely heat sealed inside the Separator pocket. This is an additional safety precaution to prevent mossy lithium on the anode from coming into contact with the cathode. A schematic illustration of the cathode is shown in FIG. 3 (left).

The conductive inorganic coating (anode-lyte) is coated onto the lithium anode using a combination of vacuum deposition and solution processing to ensure a uniform pinhole-free thin film. It is then cut into electrode shape using a laser cutter. A schematic illustration of the cathode is shown in FIG. 3 (right).

Figure 4:
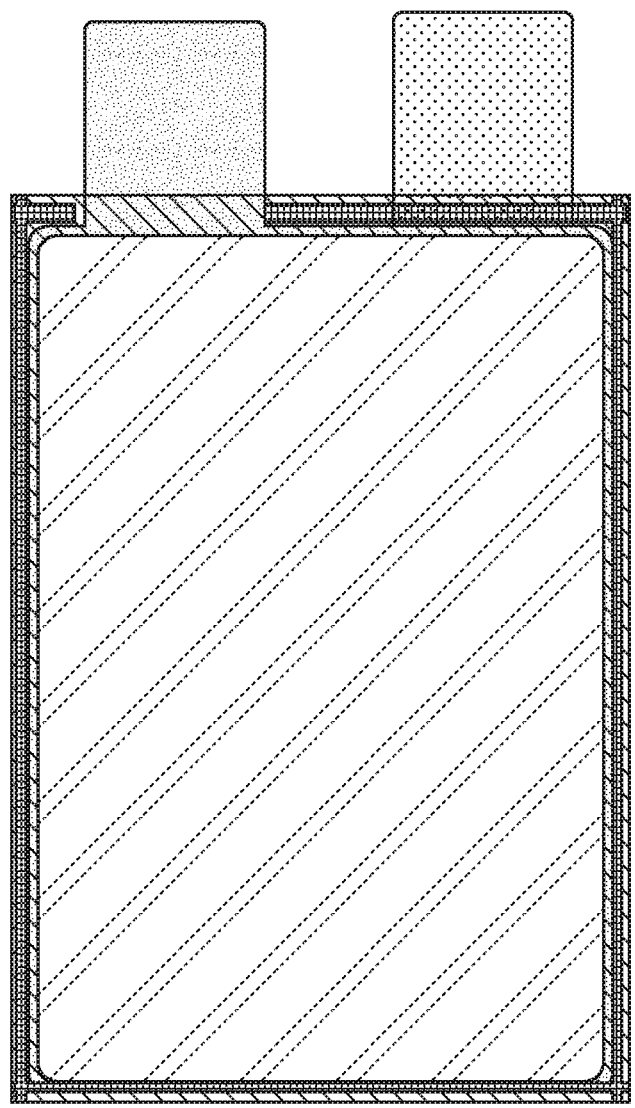
FIG. 4 is a schematic illustration of the assembled and stacked anode and cathodes according to one or more embodiments.
Figure 5:
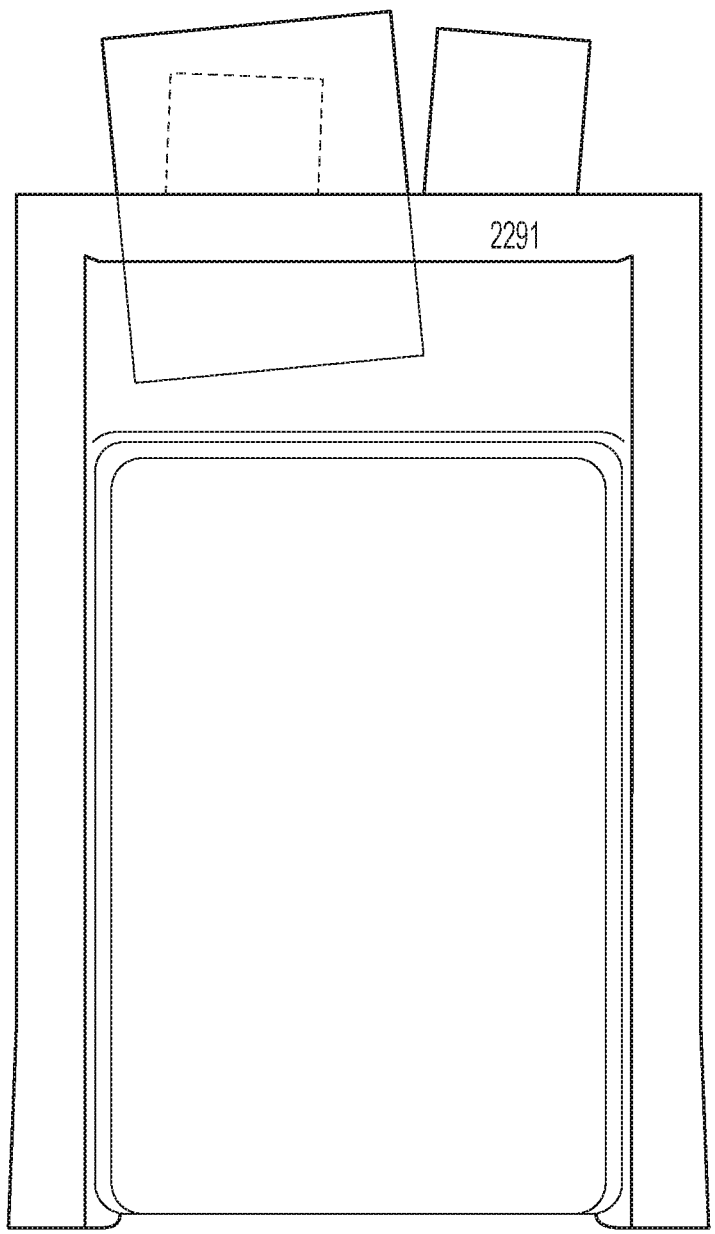
FIG. 5 is a photograph of the assembled and stacked anode and cathodes, inserted into a sealed pouch, according to one or more embodiments.

The cathode in separator packet and anode-lyte coated lithium anode are stacked together using a stacking machine. The stacking machine is designed so that it can pick up and release light, delicate, fragile and potentially sticky anode-lyte coated lithium anode materials. The final stack is shown in FIG. 4, and the tabs are subsequently ultrasonically welded onto the stack. The stack is carefully inserted into a pre-formed pouch, where the cathode-lyte is injected using a soaking process that soaks the pores of the separator and cathode. After soaking, the final pouch cell is vacuum sealed (FIG. 5) and ready for testing. At this point, it's in the discharged state and exhibits>1000 Wh/L, >350 Wh/kg, can be discharged at least (>) 1 C rate and still obtain the full capacity, and all room temperature.

A number of cells were prepared as described above for cathodes of different capacities. Cycling tests were conducted to determine capacity and energy density. The capacity and energy density can be calculated as follows.

Step 1. Assembling the Test Fixture

The cell dimensions (e.g., length, width and thickness) and mass are measured before cycling.

Figure 9A:
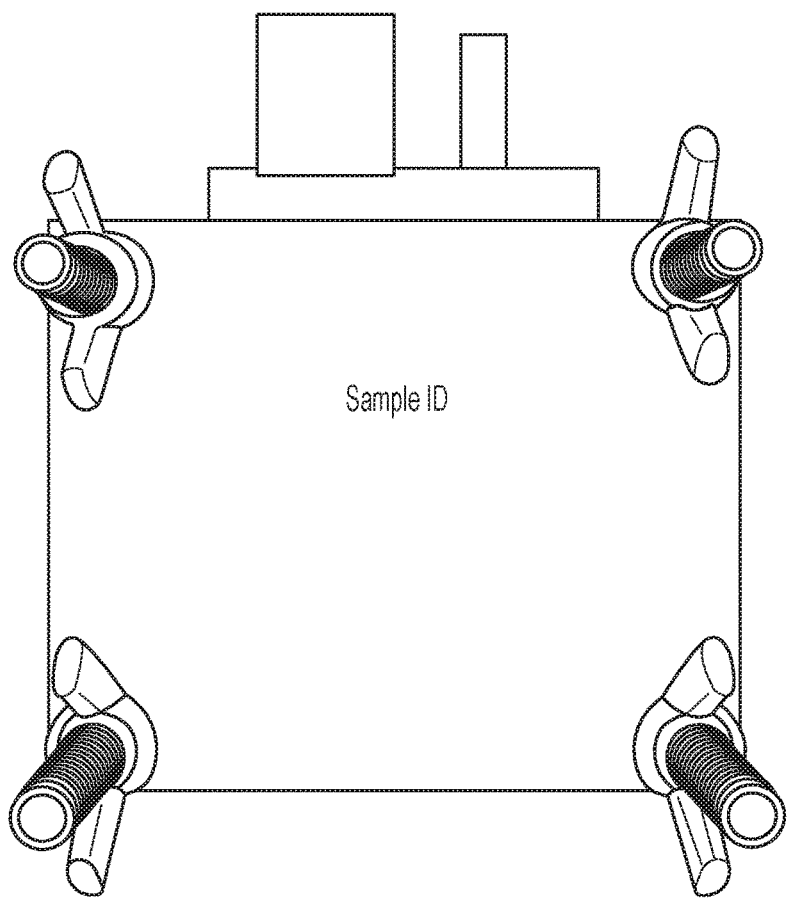
FIG. 9A is a photograph of an exemplary cell positioned between two metal plates that apply uniform pressure for performing cell cycling testing.
Figure 9B:
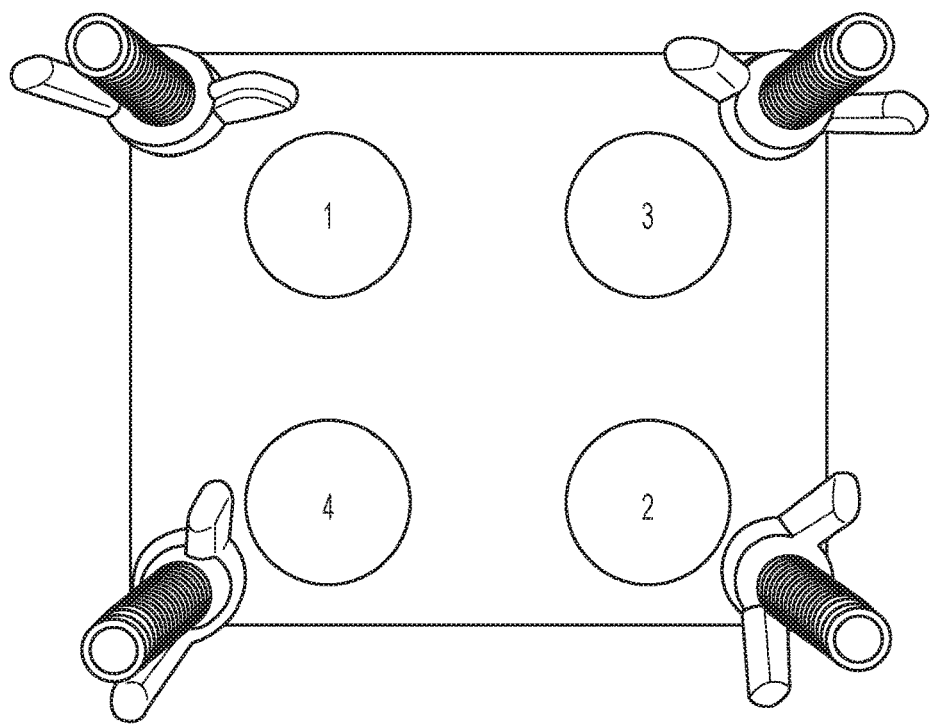
FIG. 9B illustrates the sequence of tightening the plates to provide even pressure over the cell pack area.

A uniform stack pressure is applied on the cell during cycling. To prepare for testing, the cell is positioned into a metal fixture so the cell is sandwiched between two metal plates as shown in FIG. 9A. Gently tighten the 4 wing nuts on the corners to apply 2 pound-force-inch to secure the cell inside the fixture. Follow the sequence shown in FIG. 9B from 1 to 4 to get uniform pressure. The cell is visually inspected to make sure that the plates are parallel, and the cell is centered between the plates.

Step 2. Connecting the Cell to Cycler

Connect the cells to the cycler, leaving the cells in the plates during the entire process. The cell is centered inside the metal plates, so that only the positive and negative marks are exposed terminals are exposed, as shown in FIG. 9A.

Step 3. Cycling Procedures

All measurements are taken at room temperature (20°±3 C). Cells are at 30% State of Charge (SOC), and cycling is carried out at +C/10 and −C/10 for 200 cycles using the following protocol:

Constant Current Charge at C/10 (0.32 A) until Voltage=4.3V;
Time safety limit: 14 hrs
Constant Voltage Hold at 4.3V until Current<C/20 (0.16 A);
Time safety limit: 1hr
Rest for 10 mins
Constant Current Discharge at C/10 (0.32 A) until Voltage=3.0V;
Time safety limit: 14 hrs
Rest for 10 mins End-of-Testing Criterion Life cycle testing will continue for 200 cycles or until the cells reaches an end-of-life criterion. Unless otherwise directed, the EOL criteria will be 20% loss of capacity.

The volumetric and gravimetric energy density are calculated from capacity data. The average discharge capacity of first three cycles is used to measure the energy density (Wh/L and Wh/kg). Cycling efficiency can be calculated from the second cycle. The volumetric and gravimetric energy density for cells prepared as described above are report in the table below. The cells demonstrated a capacity of greater than 3 A-h, a volume specific density of greater than 1070 Wh/L, and a gravimetric energy density of greater than 425 Wh/kg.

TABLE 1

Report of Battery Performance

| | Lot Number | | | | | |
|---|---|---|---|---|---|---|
| | H03V4 | H03V4 | H03V4 | H03V4 | H03V4 | H03V4 |
| Cell ID | L001 | L002 | L003 | L004 | L005 | L006 |
| Width (mm) | 34.97 | 35.01 | 34.99 | 34.98 | 35.01 | 34.93 |
| Length (mm) | 49.98 | 49.95 | 49.91 | 50.01 | 49.95 | 50.02 |
| Thickness (mm) | 6.68 | 6.73 | 6.72 | 6.71 | 6.74 | 6.71 |
| Mass (g) | 29.53 | 29.48 | 29.59 | 29.5 | 29.54 | 29.32 |
| OCV (V) | 3.72 | 3.72 | 3.72 | 3.72 | 3.71 | 3.72 |
| ACR (mOhm) | 12.0 | 11.9 | 12.1 | 11.7 | 16.0 | 12.0 |

TABLE 1-continued

Report of Battery Performance

| | Lot Number | | | | | |
|---|---|---|---|---|---|---|
| | H03V4 | H03V4 | H03V4 | H03V4 | H03V4 | H03V4 |
| *DCR (mOhm) | 25.24 | 25.24 | 25.24 | 24.44 | 28.24 | 25.5 |
| Capacity (Ah) | 3.279 | 3.278 | 3.297 | 3.329 | 3.32 | 3.317 |
| Energy (Wh) | 12.61 | 12.61 | 12.68 | 12.71 | 12.67 | 12.67 |
| Energy density (Wh/kg) | 427 | 427.7 | 428.5 | 430.8 | 428.9 | 432.1 |
| Energy density (Wh/L) | 1086 | 1071 | 1080 | 1083 | 1075 | 1081 |
| Cell ID | L007 | L008 | L009 | L010 | L011 | L012 |
| Width (mm) | 34.96 | 34.97 | 34.99 | 34.98 | 35.01 | 34.95 |
| Length (mm) | 50.01 | 49.96 | 50 | 49.99 | 50.02 | 50.02 |
| Thickness (mm) | 6.65 | 6.75 | 6.73 | 6.68 | 6.73 | 6.74 |
| Mass (g) | 29.23 | 29.54 | 29.54 | 29.33 | 29.53 | 29.54 |
| OCV (V) | 3.72 | 3.72 | 3.71 | 3.71 | 3.72 | 3.71 |
| ACR (mOhm) | 12.0 | 11.5 | 11.5 | 11.7 | 11.4 | 11.5 |
| *DCR (mOhm) | 24.74 | 25.81 | 24.29 | 25.2 | 24.59 | 24.29 |
| Capacity (Ah) | 3.342 | 3.334 | 3.342 | 3.345 | 3.331 | 3.316 |
| Energy (Wh) | 12.76 | 12.73 | 12.76 | 12.77 | 12.72 | 12.66 |
| Energy density (Wh/kg) | 436.5 | 430.9 | 432 | 435.4 | 430.7 | 428.6 |
| Energy density (Wh/L) | 1097 | 1079 | 1089 | 1093 | 1079 | 1074 |

Figure 6:
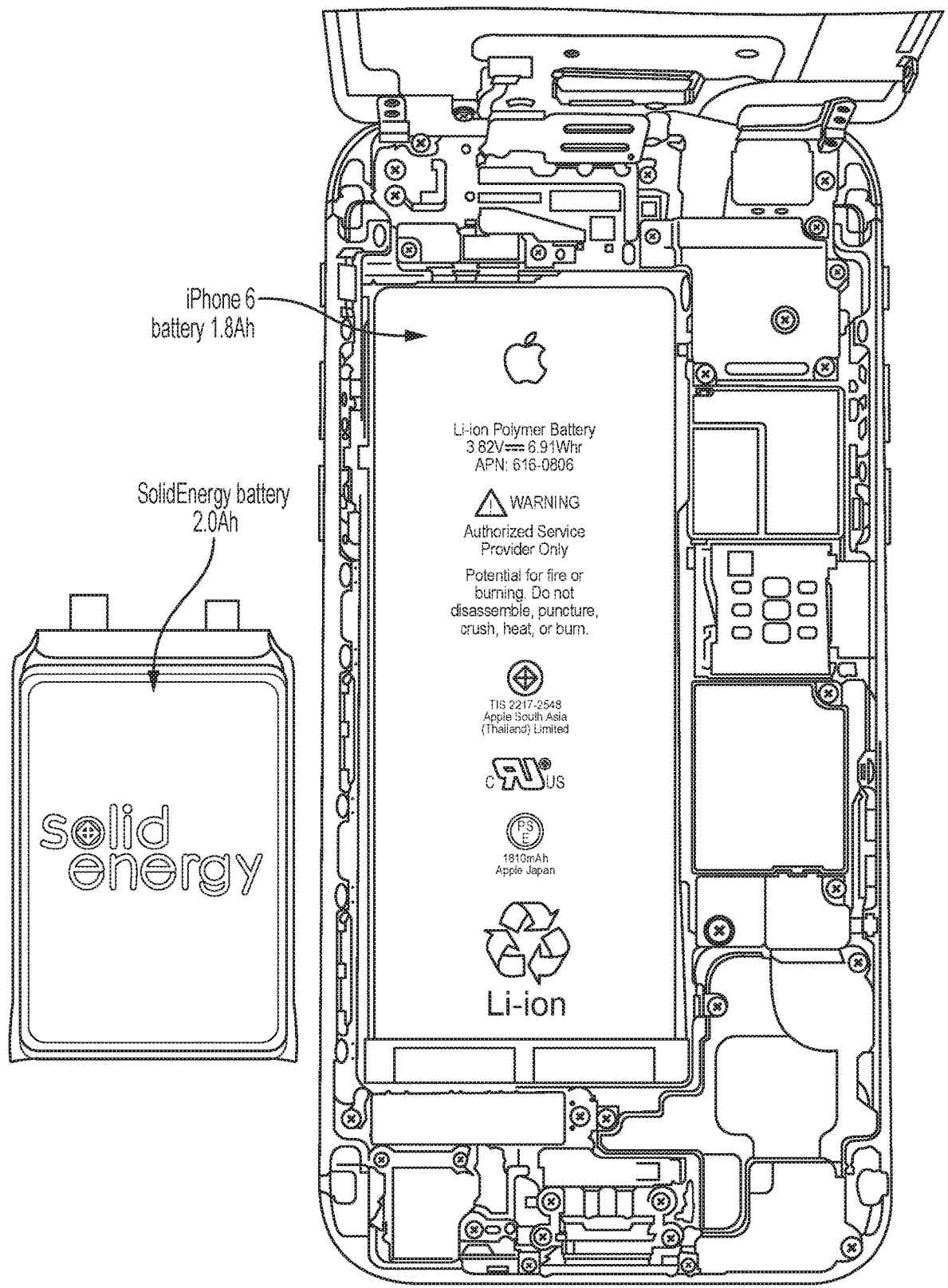
FIG. 6 is a side-by-side comparison of the "anode-free" battery as prepared according to one or more embodiments and an iPhone 6 battery, illustrating the relative energy densities of the batteries.

FIG. 6 is a side-by-side comparison of the "anode-free" battery as prepared above and an i-Phone 6 battery. The "anode-free" battery according to the present invention had an energy density of 1200 Wh/L, and is half the size of the iPhone 6 battery, yet twice the energy density (600 Wh/L). By 'anode-free' as used herein, it is meant that the anode layer as assembled in the discharge state is very thin, e.g., 5-20 μm and that n/p≤1.

Figure 7A:
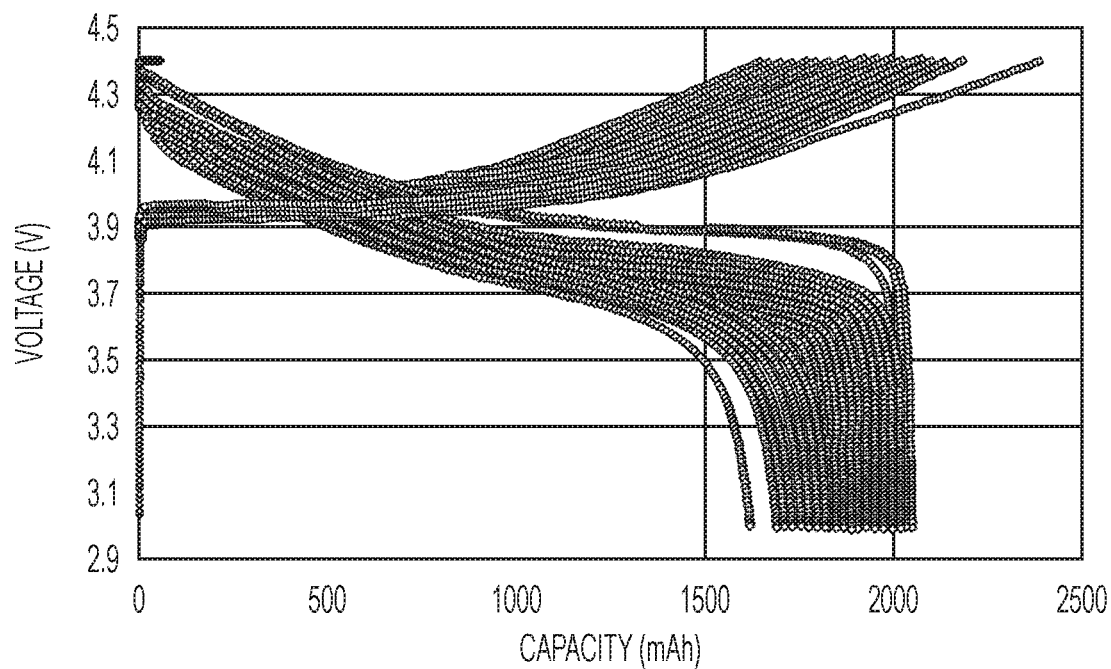
FIG. 7A is a plot of voltage versus capacity and FIG. 7B is a plot of capacity versus cycle number of a 1200 Wh/L and 400 Wh/kg cell, discharged at 1 C showing the capacity fade of a battery according to one or more embodiments.
Figure 7B:
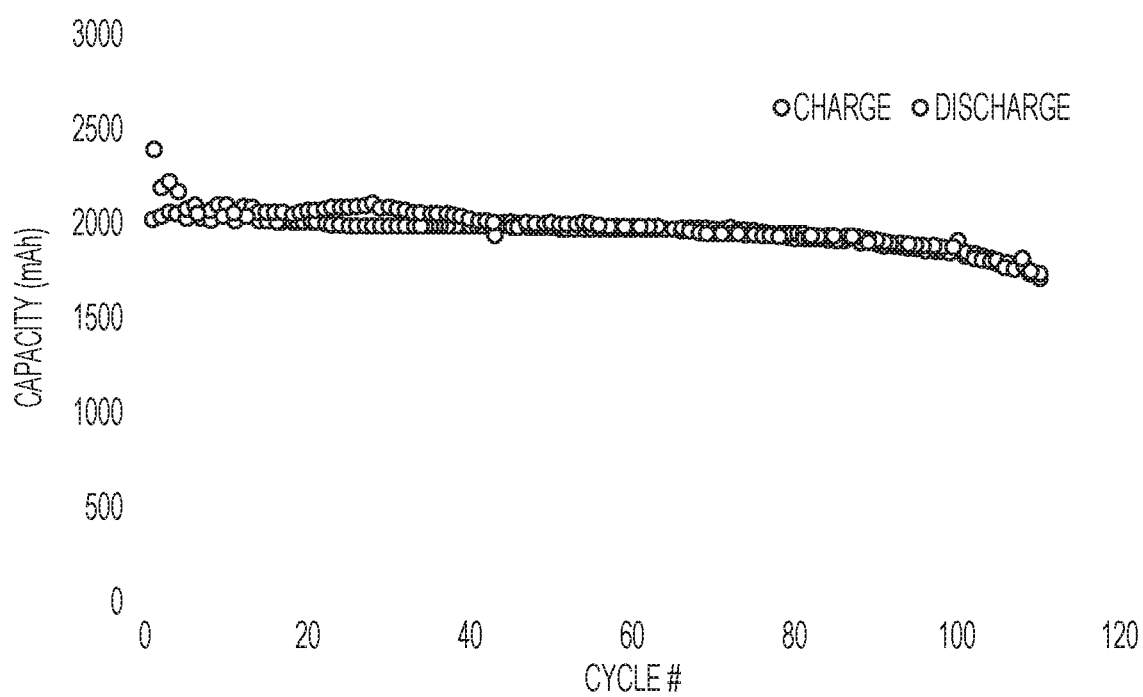

FIG. 7 is a plot of 2 Ah cells with 1200 Wh/L and 400 Wh/kg volumetric and volumetric power density, respectively, discharged at 1 C showing the capacity fade of a battery according to one or more embodiments. The cell exhibited a capacity fade of less than 20% over 100 cycles.

Figure 8A:
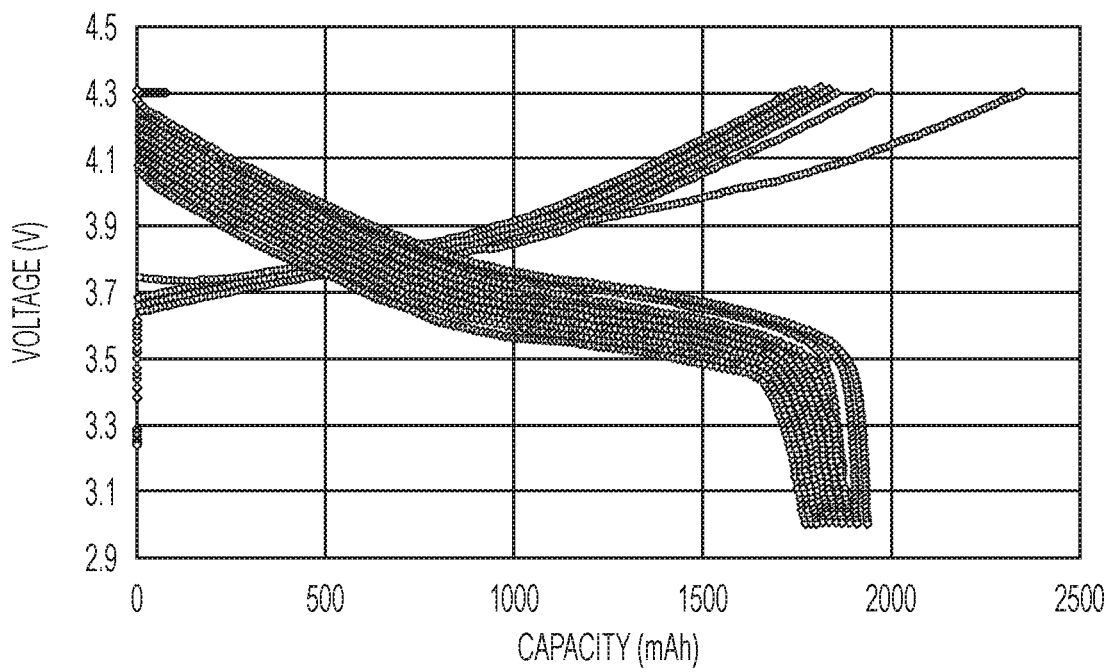
FIG. 8A is a plot of voltage versus capacity and FIG. 8B is a plot of capacity versus cycle number of a 1000 Wh/L and 350 Wh/kg cell, discharged at 1 C showing the capacity fade of a battery according to one or more embodiments.
Figure 8B:
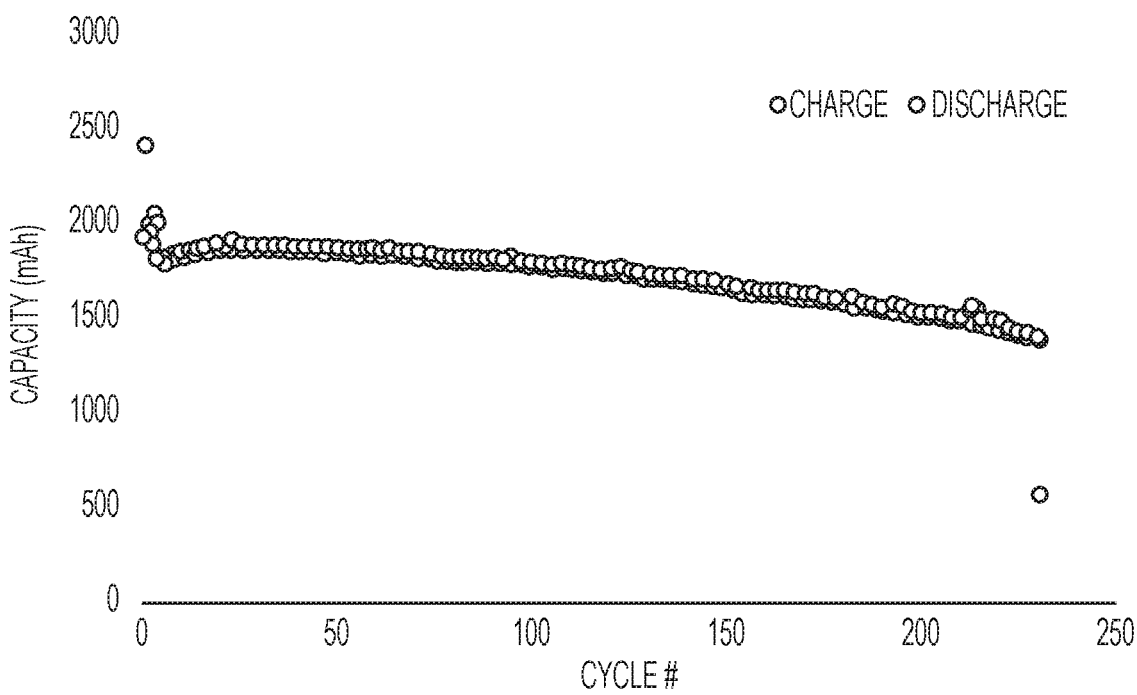

FIG. 8 is a plot of cell performance of cells with 1000 Wh/L and 350 Wh/kg volumetric and volumetric power density, respectively, discharged at 1 C showing the capacity fade of a battery according to one or more embodiments. The cell exhibited a capacity fade of less than 20% over 200 cycles.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A rechargeable battery, comprising:
a cathode comprising a layered or spinel oxide material selected from the group consisting of $LiCoO_2$, $Li(Ni_{1/3}Mn_{1/3}Co_{1/3})O_2$, $Li(Ni_{0.8}Co_{0.15}Al_{0.05})O_2$, $LiMn_2O_4$, $Li(Mn_{1.5}Ni_{0.5})_2O_4$, $Li(Ni_{0.6}Co_{0.2}Mn_{0.2})O_2$, $Li(Ni_{0.8}Co_{0.1}Mn_{0.1})O_2$, or a lithium rich version thereof;
a lithium metal anode having a thickness in the discharged state of less than about 20 μm, wherein a capacity of the cathode is greater than a capacity of the anode in a discharged state such that lithium metal anode rechargeable battery has an n/p ratio in a discharged state in a range of greater than 0.9 to less than 1;
a separator comprising a porous polymer film having a porosity of greater than 50% and thickness of less than 12 μm;
a non-aqueous liquid electrolyte selected to have electrochemical stability at a potential of the cathode material versus lithium, wherein the non-aqueous liquid electrolyte comprises:
an organic solvent composed of at least one solvent selected from the group consisting of ethylene carbonate, propylene carbonate, dimethoxyethane, diethoxyethane, triglyme, tetraglyme, diethylether, and methybutylether; and
at least one lithium imide salt having a fluorosulfonyl ($FSO_2$) group having a concentration of between 2 mole per liter of the organic solvent and 10 moles per liter of the organic solvent;

wherein the rechargeable battery:
has a gravimetric energy density of more than 300 Wh/kg;
has a capacity of greater than 1 Ah at a discharge rate of 0.5 C or faster; and
has at least 80% capacity retention after 200 charge-discharge cycles or more.

2. The battery of claim 1, wherein the lithium metal anode has a thickness in the discharged state of about 10 μm to less than 20 μm.

3. The battery of claim 1, wherein the lithium metal anode is disposed on a current collector.

4. The battery of claim 3, wherein the current collector comprises a copper foil.

5. The battery of claim 3, wherein the cathode has a potential vs. Li metal of greater than 4.0 V.

6. The battery of claim 3, wherein the cathode has a potential vs. Li of about 4.0 V to about 4.5 V.

7. The battery of claim 3, wherein the cathode has a potential vs. Li of about 4.2 V to about 4.4 V.

8. The battery of claim 3, wherein the cathode is a disposed on an aluminum foil.

9. The battery of claim 1, wherein the cathode has an energy density of greater than 3 $mAh/cm^2$.

10. The battery of claim 1, wherein the cathode has an energy density of 3-10 $mAh/cm^2$.

11. The battery of claim 1, wherein the porous polymer film comprises one or more of a polypropylene film, a polyethylene film, or a mixed polypropylene/polyethylene film.

12. The battery of claim 1, wherein the separator is a hybird separator further comprising a protective coating that comprises a Li ion conductivity of between about $10^{-8}$ and about $10^{-2}$ $ohm-cm^1$.

13. The battery of claim 1, wherein the separator further includes a protective coating, and the protective coating is an inorganic electrolyte.

14. The battery of claim 13, wherein the inorganic electrolyte is selected from the group consisting of lithium silicates, lithium borates, lithium aluminates, lithium phosphates, lithium oxynitrides, lithium oxyborides, lithium silicosulfides, lithium borosulfides, lithium aluminosulfides, lithium phosphosultides, and the combinations thereof.

15. The battery of claim 1, wherein the separator further includes a protective coating, and the protective coating comprises a polymer layer.

16. The battery of claim 15, wherein the polymer layer is an ion conductive polymer layer.

17. The battery of claim 1, wherein the separator further includes a protective coating, and the protective coating comprises a plurality of layers.

18. The battery of claim 17, wherein the protective coating comprises between 2 and 5 layers.

19. The battery of claim 17, wherein at least one of the coating layers comprises a lithium ion conducting polymer.

20. The battery of claim 17, wherein at least one of the coating layers comprises a lithium ion conducting polymer and at least one other of the coating layers comprises a polymer.

21. The battery of claim 1, wherein the non-aqueous liquid electrolyte further comprises a perchlorate salt, wherein the electrolyte is electrochemically stable at operating voltages greater than 4.2 V.

22. The battery of claim 21, wherein the perchlorate salt has a concentration between 0.05 M to 0.50 M of the organic solvent.

23. The battery of claim 21, wherein the perchlorate salt is selected from the group consisting of $LiClO_4$, $Ca(ClO_4)_2$, $Sr(ClO_4)_2$, $Mg(ClO_4)$, $Ba(ClO_4)_2$, and any combinations or mixtures thereof.

24. The battery of claim 1, wherein the imide salt comprises LiFSI.

25. The battery of claim 1, further comprising at least one protective coating disposed between the porous polymer film and the lithium metal anode, wherein the at least one protective coating is designed and configured to:
   suppress lithium dendrites from penetrating through the separator; and
   conduct lithium ions and block the non-aqueous liquid electrolyte from passing through the at least one protective coating.

26. The battery of claim 1, wherein the rechargeable battery has a gravimetric density of at least 450 Wh/kg and at least 80% capacity retention after 100 charge-discharge cycles or more.

27. The battery of claim 1, wherein the organic solvent consists essentially of dimethoxyethane, and the non-aqueous liquid electrolyte has a lithium salt concentration between 4 to 6 moles per liter of the organic solvent.

28. The battery of claim 1, wherein the organic solvent consists essentially of ethylene carbonate, and the non-aqueous liquid electrolyte has a lithium salt concentration between 2 to 3 moles per liter of the organic solvent.

* * * * *

UNITED STATES PATENT AND TRADEMARK OFFICE
CERTIFICATE OF CORRECTION

PATENT NO. : 11,245,133 B2  
APPLICATION NO. : 16/308023  
DATED : February 8, 2022  
INVENTOR(S) : Qichao Hu et al.

Page 1 of 1

It is certified that error appears in the above-identified patent and that said Letters Patent is hereby corrected as shown below:

In the Claims

In Column 20, Line 33, Claim 12, the word "hybird" should be replaced with the word "hybrid".

In Column 20, Line 44, Claim 14, the word "phosphosultides" should be replaced with the word "phosphosulfides".

In Column 21, Line 3, Claim 23, the term "Mg(ClO4)" should be replaced with "Mg(ClO4)2".

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*